July 20, 1954    F. BUSEMANN    2,684,460
DIRECT CURRENT ELECTRIC TRANSMISSION SYSTEM
Filed Feb. 29, 1952    2 Sheets-Sheet 1
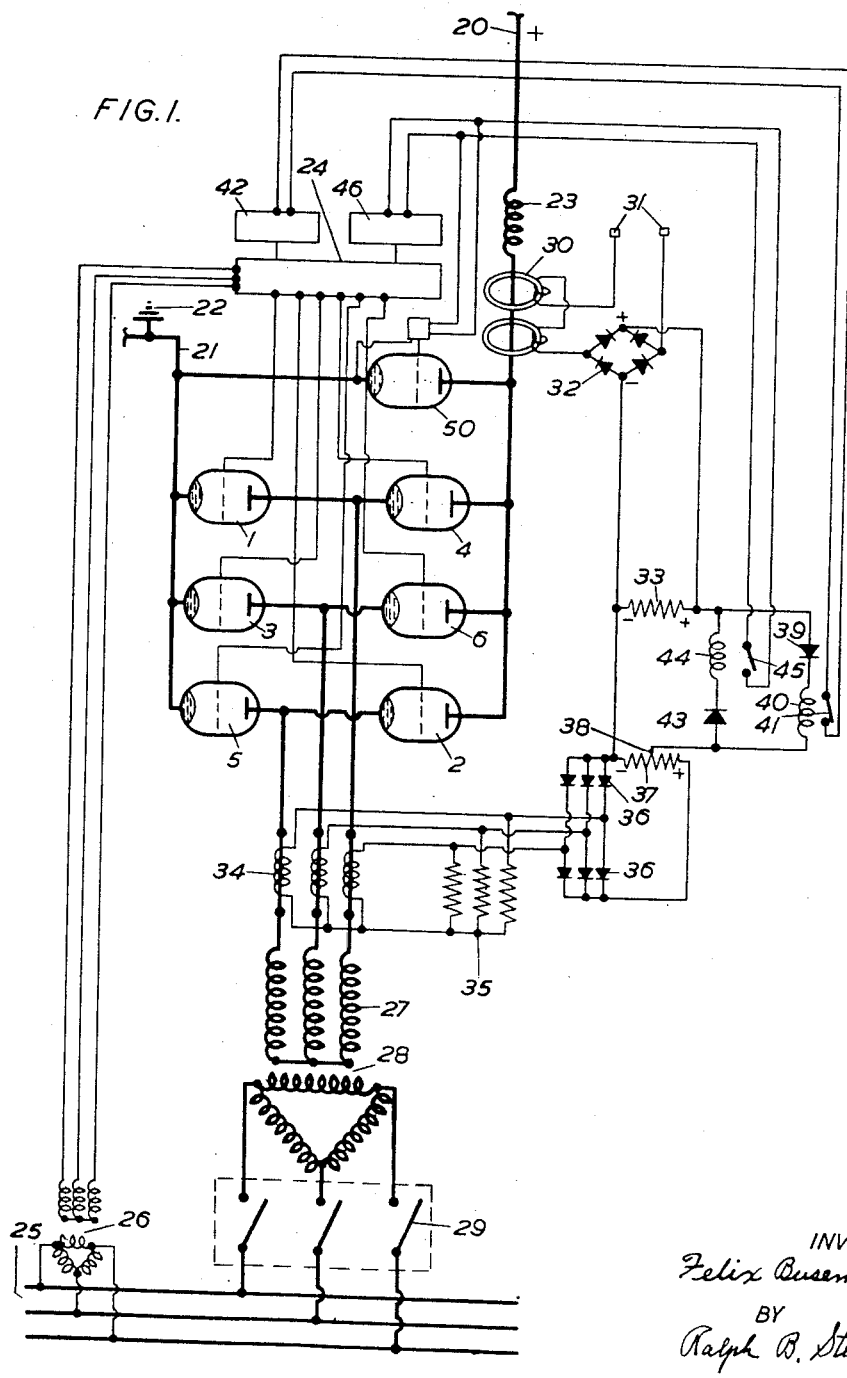
INVENTOR
Felix Busemann
BY
Ralph B. Stewart
ATTORNEY July 20, 1954  F. BUSEMANN  2,684,460
DIRECT CURRENT ELECTRIC TRANSMISSION SYSTEM
Filed Feb. 29, 1952  2 Sheets-Sheet 2
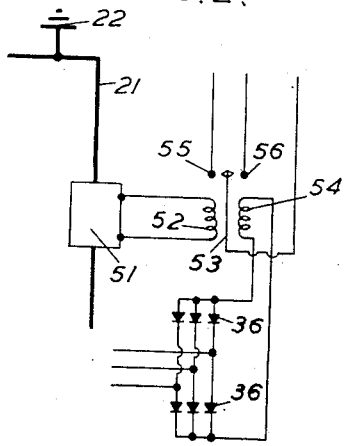
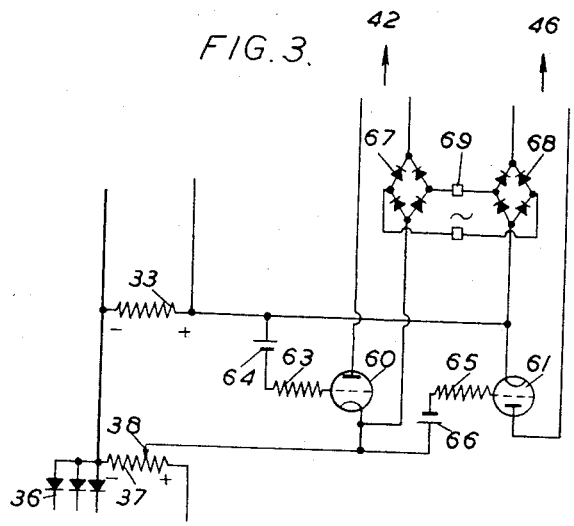
INVENTOR
Felix Busemann
BY
Ralph B. Stewart
ATTORNEY Patented July 20, 1954

2,684,460

UNITED STATES PATENT OFFICE 2,684,460

DIRECT CURRENT ELECTRIC TRANSMISSION SYSTEM

Felix Busemann, Greenford, England, assignor, by mesne assignments, to E. R. A. Patents Limited, Leatherhead, England, a body corporate of Great Britain Application February 29, 1952, Serial No. 274,259

Claims priority, application Great Britain March 6, 1951

5 Claims. (Cl. 321—11)

This invention relates to high voltage direct current electric power transmission systems of the type in which valve converters connected in double path bridge arrangement serve to rectify alternating current from a mains supply transformer so as to provide direct current for the transmission line, and further valve converters connected in a corresponding manner at the far end of the line serve to invert the direct current and provide alternating current at the desired point. The invention is particularly concerned with the protection of the inverting installation for such a transmission system.

In such systems, power is transmitted over the direct current line at voltages of the order of 100,000 volts with power of the order of 100,000 kilowatts. The valve converters are usually of the mercury vapour type connected in three-phase bridge arrangement, both at the rectifying end and also at the inverting end. Thus each set comprises three pairs of converters connected anode to cathode, one pair for each transformer phase.

In general, a two-conductor line with the midpoint earthed is employed, so that there is one set of six converters between one conductor and the earthed point, and a further set between the earthed point and the other conductor. Each set is fed from a three-phase transformer with each phase of the secondary winding connected to the interconnected anode and cathode of one pair of converters. Similar installations are employed for both rectifying and inverting processes and at the latter installation the direct current power from the line is converted into alternating current output by timing the commutation from converter to converter by means of a local alternating current supply system. The direct current from one line conductor passes through one of the converters at the positive pole, then flows through the transformer and then through one of the converters on the negative side to the other line conductor. In passing through the transformer, the current flows in opposition to the voltage of the local alternating current supply and it is in this way the power is absorbed into the alternating current system.

Inverting installations of this kind are susceptible to a number of faults of which the most frequent are commutation failure, failure to operate as an inverter resulting from excessive reductions in voltage on the alternating current side, and backfires. In the case of commutation failure which may be due to a very heavy reduction in the alternating current voltage, it may happen that the direct current flows directly from one line conductor to the other through a pair of converters connected in series, thus effectively by-passing the transformer. Thus although the full direct current flows in the line and would be indicated as such by instruments on the direct current side, no current would at that time be flowing in the transformer and consequently any instruments on the alternating current side would either indicate zero current or at least a greatly reduced current.

In the case of a backfire which is usually the severest of the faults occurring, the valve action of one or more of the converters breaks down, giving a local circulating current flowing in a closed circuit which includes one of the converters, the transformer and a second converter connected to the same direct current terminal. This current is not limited by the main direct current flowing in the lines and may reach a considerable magnitude before it is checked. Since this current flows through the transformer, it is recorded by instruments on the alternating current side as a sudden rise in current, but no corresponding rise is indicated by instruments recording the current in the direct current line.

The present invention is based on the fact that on the occurrence of any of the above faults, either the direct current materially exceeds the alternating current or vice versa, and, therefore, in accordance with the invention, the direct current flowing in the lines to the converters is compared with the inverted alternating current in such a way that when one materially exceeds the other, a warning is given or protective devices are brought into operation or both. The faults mentioned above and indicated by an excess of direct current can be dealt with by advancing the phase angle of the grid impulses to the inverters and a protective device may be brought into operation for this purpose. Similarly, the faults indicated by an excess of alternating current can be dealt with only by interrupting the grid impulses and providing a low resistance current path by-passing the inverters, and under these conditions a further protective device may be brought into operation for this purpose.

The currents to be compared may be derived from the respective direct and alternating currents in a variety of ways. That derived from the direct current may be obtained, for example, from a magnetic amplifier or from a shunt connected in the main supply line, while that derived from the alternating current may be obtained from a current transformer and may then be rectified so as to provide a direct comparison with the direct current.

Circuits for comparing the two currents are shown in more detail in the accompanying drawings, which illustrate embodiments of inverter installations in accordance with the invention.

The inverter installation is situated at one end of a two-conductor transmission line of which only the positive conductor 20 and the mid-point constituted by a busbar 21, earthed at 22, are shown. The whole installation is duplicated between the mid-point and the negative conductor. The direct current arriving by way of the positive conductor 20 is smoothed by an inductor 23 and is inverted by means of mercury-vapour converters 1 to 6, which are rendered conductive in the order of their reference numerals by means of positive grid impulses supplied from a controller unit 24. The impulses are timed by means of local three-phase alternating current mains 25, which supply the controller 24 by way of an auxiliary transformer 26. The currents from the converters flow through the star-connected secondary winding 27 of a main transformer 28 connected to the supply mains 25 through a circuit breaker 29. The grid impulses are so timed that the current in the secondary winding of the primary winding 28 flows in opposition to the voltage of the supply mains 25 so that the power from the direct current mains is absorbed into the alternating current mains.

The faults which may occur in such a system have already been mentioned, but may be understood more readily from reference to the drawings. If as a result of commutation failure, the converters 1 and 4 are conductive simultaneously, then the current has a direct path from the positive line 20 to the intermediate line 21 and by-passes the transformer 28, so that the direct current flowing in the line conductor 20 is greater than the corresponding inverted alternating current flowing in the transformer. The reverse occurs in the event of a backfire. If, for example, the converter 4 is conducting, then at the end of its conducting period, the converter 6 should take over. If, however, at this stage, the converter 4 backfires and its valve action breaks down, the result is that a circulating current flows through the converter 6, through two of the secondary phases 27 and back through the converter 4 to the positive line conductor. Under normal conditions, current in the converters is limited to that carried by the supply line, but in the event of a backfire, the current is limited only by the impedance of the local circuit, i. e. of two converters and two phases of the secondary winding, and an abrupt rise of current occurs. Since this current flows through the secondary winding of the transformer, a corresponding current is induced in the primary winding and a considerable excess of the alternating current over the direct current results.

In order to detect and correct faults of the above nature, the direct and alternating currents are compared one against the other. For this purpose, as shown in Figure 1, a magnetic amplifier 30 energised from an alternating current source 31 is connected in the positive line conductor 20. The output of the magnetic amplifier 30 is rectified by means of a bridge rectifier 32 and the resulting direct current flows through a resistance 33.

On the alternating current side, current transformers 34 are connected in the leads to the secondary winding 27 of the main transformer 28, each secondary winding of the current transformers being shunted by a resistance 35 in the usual way to provide a current path, although of higher resistance, in the event of an open circuit of the rectifier 36 occurring. The alternating currents are rectified by pairs of half-wave rectifiers 36 and the resultant direct current is caused to flow through a resistance 37. The resistance 37 is provided with a variable tapping 38 and, under normal conditions of operation, the tapping is adjusted until there is no voltage drop between it and the right-hand end of the resistance 33. In other words, the voltage drop in the resistance 33 produced by a current proportional to the direct current in the line conductor 20 is equal to the voltage drop produced in the resistance 38 by a current proportional to the alternating current flowing to the seconday winding 27 of the main transformer 28.

In the event of a fault, however, either the alternating current or the direct current will predominate and, under these conditions, a voltage difference will exist between the tapping 38 and the right-hand end of the resistance 33. If the direct current predominates, then the potential of the right-hand end of the resistance 33 will increase and current will flow by way of a rectifier 39 through the coil of a relay 40. This closes its contacts 41 to complete a circuit to a unit 42 connected to the main grid control unit 24 and serving to advance the phase angle to correct the fault.

If, however, the alternating current predominates, current flows by way of a rectifier 43 through the coil of a relay 44 to close its contacts 45. This in its turn operates a unit 46 connected to the main grid control unit 24 so as to interrupt the grid impulses. At the same time, it applies a positive bias to the grid of a by-pass converter 50 connected directly between the positive line 20 and the intermediate line 21. This relieves the faulty converter of its current and enables it to recover. As soon as normal running is re-established, the corresponding relay is de-energised and operation continues.

As illustrated in Figure 1, a current proportional to the main line direct current is derived by way of the magnetic amplifier 30. In the alternative illustrated in Figure 2, the magnetic amplifier 30 is replaced by a shunt 51, the output terminals of which are connected to one coil 52 of a differential relay 53. In order to keep the potential of the protective equipment with respect to earth as low as possible, the shunt 51 is connected in the busbar 21. The other coil 54 of the relay 53 is supplied from the rectifiers 36 with the current proportional to the alternating current. Under conditions of balance, the armature of the relay takes up an intermediate position as shown. If, however, the direct current predominates, the armature is pulled to the right to engage a fixed contact 56 to energise the unit 46 and thus interrupt the grid impulses and render the by-pass valve 50 conductive.

In the circuit of Figure 3, the voltage difference between the tapping 38 and the right-hand end of the resistance 33 resulting from fault conditions is used to render conductive either one of a pair of gas filled triodes 60 and 61. The triode 60 has its cathode connected to the tap 38 and its grid connected by way of a high resistance 63 and a source of biassing potential 64 to the right-hand end of the resistance 33. The triode 61 has its cathode connected to the right-hand end of the resistance 33 and its grid connected by way of a high resistance 65 and a source of biassing potential 66 to the tapping 38. The anode circuits are supplied respectively by rectifiers 67 and 68 from a source 69 of alternating current 69. Thus when the direct current predominates the grid of the triode 60 is rendered more positive with respect to its cathode and the tube is rendered conductive to operate the unit 42. Similarly if the alternating current predominates the unit 46 is operated.

The three circuits just described are illustrative of a large number of different methods of comparing the direct and alternating currents.

I claim:

1. In an inverting installation for a high voltage direct current electric power transmission system, the combination of a pair of direct current terminals, a line conductor connected to one of said terminals, three pairs of grid-controlled current converters connected anode to cathode between said terminals, grid control means for said converters, a three-phase power transformer having two windings, a three-phase alternating current supply, the phase connections of the first winding of said transformer being connected between mid-points of said pairs of current converters, the phase connections of the second winding of said transformer being connected to said alternating current supply, a first protective device for advancing the phase angle of impulses from said grid control means, a second protective device for interrupting impulses from said grid control means and for establishing a low resistance current path by-passing said converters, means for comparing the direct current in said line conductor with the alternating current in said transformer on an equal basis, means responsive to material excess of the direct current for operating said first protective device and means responsive to material excess of the alternating current for operating said second protective device.

2. In an inverting installation for a high voltage direct current electric power transmission system, the combination of a pair of direct current terminals, a line conductor connected to one of said terminals, three pairs of grid-controlled current converters connected anode to cathode between said terminals, grid control means for said converters, a three-phase power transformer having two windings, a three-phase alternating current supply, the phase connections of the first winding of said transformer being connected between mid-points of said pairs of current converters, the phase connections of the second winding of said transformer being connected to said alternating current supply, a first protective device for advancing the phase angle of impulses from said grid control means, a second protective device for interrupting impulses from said grid control means and for establishing a low resistance current path by-passing said converters, means for deriving a direct current proportional to the direct current in said line conductor, a resistance supplied with said proportional direct current, a current transformer for deriving a current proportional to the alternating current in said power transformer, a rectifier for the output current of said current transformer, a second resistance supplied with the output direct current from said rectifier, one end of said second resistance being connected to one end of said first resistance, a variable tapping in said second resistance whereby under normal conditions zero voltage difference may be established between said tap and the other end of said first resistance, means responsive to the voltage difference between said tap and the other end of said first resistance set up by excess current in said first resistance for operating said first protective device and means responsive to the voltage difference between said tap and the other end of said first resistance set up by excess current in said second resistance for operating said second protective device.

3. An inverting installation according to claim 2, in which said means for operating said protective devices comprises an electro-magnetic relay, a rectifier connected in series with the coil of said relay between said tap and the other end of said first resistance in such a direction as to pass current in the event of excess current in said first resistance so as to actuate said relay, said relay serving to complete a circuit to operate said first protective device, a second electro-magnetic relay and a second rectifier connected in series with the coil of said second relay between said tap and the other end of said first resistance in the opposite direction to said first rectifier, said second relay serving to complete a circuit to operate said second protective device.

4. An inverting installation according to claim 2, in which said means for operating said protective devices comprise a pair of gas-filled tubes having the voltage difference between said tap and the other end of said first resistance applied between the cathode and the grid of each said tube, said voltage difference being applied in opposite directions for each said tube, whereby one said tube is rendered conductive in the event of excess current in said first resistance to operate said first protective device and said other tube is rendered conductive by excess of current in said second resistance to operate said second protective device.

5. In an inverting installation for a high voltage direct current electric power transmission system, the combination of a pair of direct current terminals, a line conductor connected to one of said terminals, three pairs of grid-controlled current converters connected anode to cathode between said terminals, grid control means for said converters, a three-phase power transformer having two windings, a three-phase alternating current supply, the phase connections of the first winding of said transformer being connected between mid-points of said pairs of current converters, the phase connections of the second winding of said transformer being connected to said alternating current supply, a first protective device for advancing the phase angle of impulses from said grid control means, a second protective device for interrupting impulses from said grid control means and for establishing a low resistance current path by-passing said converters, means for deriving a direct current proportional to the direct current in said line conductor, a current transformer for deriving a current proportional to the alternating current in said power transformer, a rectifier for the output current of said current transformer, a differential relay provided with opposing energizing coils, one of said coils being supplied with the current proportional to the current in said line conductor, the other of said coils being supplied with the output direct current from said rectifier, and circuits completed alternatively when the current in one of said coils exceeds that in the other of said coils for energising said protective devices.

References Cited in the file of this patent

UNITED STATES PATENTS

| Number | Name | Date |
|---|---|---|
| 2,354,158 | Taliaferro | July 18, 1944 |
| 2,434,214 | Lerstrup | Jan. 6, 1948 |
| 2,510,616 | Bany et al. | June 6, 1950 |